US012428988B1

(12) United States Patent
Sibbach et al.

(10) Patent No.: US 12,428,988 B1
(45) Date of Patent: Sep. 30, 2025

(54) HIGH TEMPERATURE ANTI-ICE SYSTEMS FOR AIRCRAFT ENGINES

(71) Applicant: General Electric Company, Cincinnati, OH (US)

(72) Inventors: Arthur W. Sibbach, Boxford, MA (US); Brandon W. Miller, Evendale, OH (US); Jeffrey D. Clements, Evendale, OH (US); Daniel A. Niergarth, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/807,428

(22) Filed: Aug. 16, 2024

(51) Int. Cl.
F02C 6/08 (2006.01)
F02C 7/10 (2006.01)
F02C 7/18 (2006.01)
F02C 6/18 (2006.01)

(52) U.S. Cl.
CPC ................. F02C 6/08 (2013.01); F02C 7/10 (2013.01); F02C 7/18 (2013.01); F02C 6/18 (2013.01)

(58) Field of Classification Search
CPC ...... F02C 6/08; F02C 6/18; F02C 7/10; F02C 7/18; B64D 13/06; B64D 2013/0603; B64D 2013/0607; B64D 15/00; B64D 15/02; B64D 15/04; B64D 2013/0618; F01D 25/02; F05D 2260/213
See application file for complete search history.

(56) References Cited

U.S. PATENT DOCUMENTS

| 5,484,122 | A  | 1/1996  | DeSalve           |
| 7,374,404 | B2 | 5/2008  | Schilling         |
| 9,045,991 | B2 | 6/2015  | Read et al.       |
| 9,114,877 | B2 | 8/2015  | Weber et al.      |
| 9,868,540 | B2 | 1/2018  | Barmichev et al.  |
| 9,982,598 | B2 | 5/2018  | Pritchard, Jr. et al. |
| 10,100,733 | B2 | 10/2018 | O'Toole et al.   |
| 10,294,816 | B2 | 5/2019  | Mountz et al.    |
| 10,294,873 | B2 | 5/2019  | Papa et al.      |
| 10,589,866 | B2 | 3/2020  | Morishita et al. |
| 10,634,050 | B2 | 4/2020  | Beutin et al.    |

(Continued)

FOREIGN PATENT DOCUMENTS

| CN | 209634737 U | 11/2019 |
| CN | 115973421 U | 4/2023  |

OTHER PUBLICATIONS

United States Patent and Trademark Office, "Notice of Allowance and Fee(s) Due," issued in connection with U.S. Appl. No. 17/958,617, dated Feb. 2, 2023, 11 pages.

Primary Examiner — William H Rodriguez
(74) Attorney, Agent, or Firm — Hanley, Flight & Zimmerman, LLC

(57) ABSTRACT

Aircraft engines and high temperature anti-ice systems for aircraft engines are disclosed herein. An example aircraft engine includes: a fan including a plurality of fan blades; a turbomachine operably coupled to the fan for driving the fan, the turbomachine including a compressor section, a combustion section, and a turbine section; a supply duct to accept bleed air from the compressor section; and a heat exchange system to capture waste heat from the turbine section and convey the waste heat to the bleed air, the bleed air with the waste heat to be conveyed to at least one of an environmental control system or a wing of an aircraft.

20 Claims, 9 Drawing Sheets

(56) References Cited

U.S. PATENT DOCUMENTS

| | | |
|---|---|---|
| 10,711,787 B1 | 7/2020 | Kroger et al. |
| 10,711,797 B2 | 7/2020 | Kroger et al. |
| 10,724,435 B2 | 7/2020 | Kroger et al. |
| 10,794,396 B2 | 10/2020 | Kroger et al. |
| 10,815,886 B2 | 10/2020 | Kroger et al. |
| 10,823,066 B2 | 11/2020 | Miller et al. |
| 10,961,907 B2 | 3/2021 | Castillo De Alvear et al. |
| 11,214,376 B2 | 1/2022 | Kutzmann et al. |
| 11,434,824 B2 | 9/2022 | Rambo et al. |
| 11,518,525 B2 | 12/2022 | Suciu et al. |
| 11,542,870 B1 | 1/2023 | Rambo |
| 11,674,438 B1 | 6/2023 | Rambo |
| 11,725,584 B2 | 8/2023 | Niergarth et al. |
| 11,739,689 B2 | 8/2023 | Sibbach et al. |
| 11,815,024 B2 | 11/2023 | Niergarth |
| 11,828,223 B2 | 11/2023 | Briley et al. |
| 11,927,142 B2 | 3/2024 | Westervelt et al. |
| 11,946,378 B2 | 4/2024 | Westervelt |
| 11,976,863 B2 | 5/2024 | Snape et al. |
| 11,994,066 B2 | 5/2024 | Miller et al. |
| 12,018,594 B2 | 6/2024 | Sibbach et al. |
| 12,037,943 B2 | 7/2024 | St. Pierre et al. |
| 2011/0131999 A1* | 6/2011 | Gao ................ B64D 13/06 60/785 |
| 2014/0250898 A1 | 9/2014 | Mackin et al. |
| 2017/0167382 A1 | 6/2017 | Miller |
| 2017/0267360 A1 | 9/2017 | Heid |
| 2017/0268423 A1* | 9/2017 | Schwarz ............ H02K 7/1823 |
| 2017/0268430 A1* | 9/2017 | Schwarz .................. F02C 9/18 |
| 2017/0268431 A1* | 9/2017 | Schwarz .................. F02C 6/08 |
| 2017/0363014 A1* | 12/2017 | Taylor .................... F02C 7/32 |
| 2018/0073431 A1 | 3/2018 | Smith et al. |
| 2019/0039742 A1 | 2/2019 | Gordon et al. |
| 2021/0284351 A1 | 9/2021 | Chilukuri et al. |
| 2021/0340914 A1 | 11/2021 | Niergarth |
| 2021/0348564 A1 | 11/2021 | Mackin et al. |
| 2022/0145796 A1 | 5/2022 | Hallisey et al. |
| 2022/0252011 A1 | 8/2022 | Rambo et al. |
| 2023/0228214 A1 | 7/2023 | Miller et al. |
| 2023/0383694 A1 | 11/2023 | Palmer |
| 2023/0392549 A1 | 12/2023 | Sharma et al. |
| 2024/0011417 A1 | 1/2024 | Sibbach |
| 2024/0084731 A1* | 3/2024 | Retersdorf ............... F02C 6/18 |
| 2024/0102417 A1* | 3/2024 | Taylor ..................... F02K 3/02 |

* cited by examiner

HIGH TEMPERATURE ANTI-ICE SYSTEMS FOR AIRCRAFT ENGINES

TECHNICAL FIELD

The present subject matter relates generally to aircraft engines and, more particularly, to high temperature anti-ice systems for aircraft engines.

BACKGROUND

During inclement weather, freezing rain, hail, sleet, and/or ice can accumulate on the wings and inlet components of aircraft engines. Accumulated ice can break off and be ingested into the engine. Further, large portions of ice can damage engine fan blades or other downstream components of the engine.

BRIEF DESCRIPTION OF THE DRAWINGS

In general, the same reference numbers will be used throughout the drawing(s) and accompanying written description to refer to the same or like parts. The figures are not necessarily to scale

DETAILED DESCRIPTION

Anti-ice systems in traditional tube and wing aircraft use bleed air from the aircraft engines to convey heat from the aircraft engines to the wings and other portions of the aircraft to prevent or eliminate the accumulation and/or formation of ice. In many traditional aircraft designs, fuel tanks are located in the wings in proximity to the aircraft engines. Jet fuel such as, for example, Jet A and Jet A1, have autoignition temperatures of about 210 degrees Celsius (approximately 410 degrees Fahrenheit) to about 232 degrees Celsius (approximately 450 degrees Fahrenheit). The autoignition temperature may be affected by pressure, volume, contaminants, additives, etc. Anti-ice systems in traditional tube and wing aircraft use bleed air from the aircraft engines that are at a temperatures below the autoignition temperature of jet fuel. Using bleed air at temperatures below the autoignition temperature of jet fuel avoids having air with temperatures that could ignite the jet fuel routed in supply ducts near the fuel tanks.

Aircraft designs including transonic truss brace wing and/or blended wing body are designs that separate the fuel tanks from the aircraft engines and, thus, from the bleed air that is used in anti-ice systems. Disclosed herein are example anti-ice systems that utilize higher temperature bleed air such as bleed air with temperatures above the autoignition temperature of jet fuel. Examples disclosed herein include an anti-ice bleed system that heats the bleed air using waste heat from a turbine of an aircraft engine by either a direct contact heat exchanger or through a thermal transport bus. In some examples, post combustion bleed air may be used. Providing high temperature bleed air to the aircraft, minimizes the mass flow of bleed air or a thermal transport fluid used in the anti-ice systems because less total mass flow can deliver the same thermal capacity with less air or fluid, which improves engine efficiency (e.g., thrust-specific fuel consumption).

Inclusion of example anti-ice systems disclosed herein provides an anti-icing or de-icing mechanism that prevents the buildup and shedding of pieces of ice into the engine during, e.g., adverse weather conditions, resulting in safer operation of the gas turbine engine.

Figure 1:
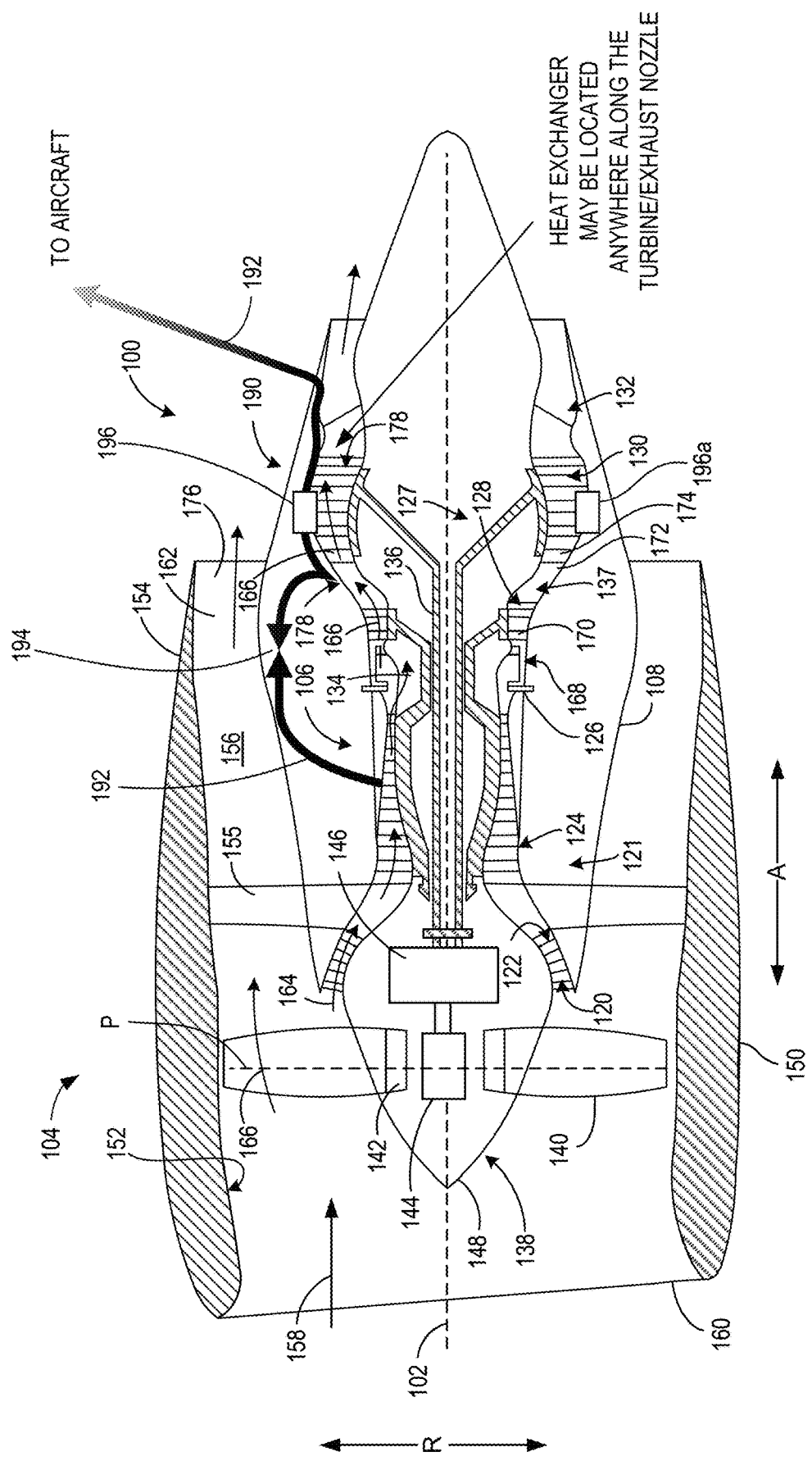
FIG. 1 is a schematic cross-sectional view of an example aircraft engine with an example anti-system according to the teachings of this disclosure.

Referring now to the drawings, FIG. 1 is a schematic cross-sectional view of an example gas turbine engine 100 in accordance with teachings of this disclosure. In the illustrated example, the gas turbine engine 100 is an aeronautical, turbofan jet engine, referred to herein as "aircraft engine 100" or just "engine." The aircraft engine 100 is configured to be mounted to an aircraft, such as for example, in an under-wing configuration or tail-mounted configuration. As shown in FIG. 1, the aircraft engine 100 defines an axial direction A (extending parallel to a longitudinal centerline 102 provided for reference), a radial direction R, and a circumferential direction (i.e., a direction extending about the axial direction A; not depicted). In general, the aircraft engine 100 includes an example fan section 104 and an example turbomachine 106 disposed downstream from the fan section 104 (the turbomachine 106 sometimes also, or alternatively, referred to as a "core turbine engine").

In some examples, the turbomachine 106 includes a substantially tubular example outer casing 108 that defines an example annular inlet 120. The outer casing 108 encases, in serial flow relationship, an example compressor section 121 including an example first, booster or low pressure (LP) compressor 122 and an example second, high pressure (HP) compressor 124; an example combustion section 126; an example turbine section 127 including an example first, high pressure (HP) turbine 128 and an example second, low pressure (LP) turbine 130; and an example jet exhaust nozzle section 132. An example high pressure (HP) shaft 134 drivingly connects the HP turbine 128 to the HP compressor 124. An example low pressure (LP) shaft 136 drivingly connects the LP turbine 130 to the LP compressor 122. The compressor section, combustion section 126, turbine section, and jet exhaust nozzle section 132 are arranged in serial flow order and together define a core air flowpath 137 through the turbomachine 106. In some examples, the anti-ice systems disclosed herein are also compatible with an engine having an intermediate pressure turbine, e.g., an engine having three spools.

Referring still the embodiment of FIG. 1, the fan section 104 includes an example variable pitch, single stage fan 138. The turbomachine 106 is operably coupled to the fan 138 for driving the fan 138. The fan 138 includes a plurality of example rotatable fan blades 140 coupled to an example disk 142 in a spaced apart manner. As depicted in FIG. 1, the fan blades 140 extend outwardly from disk 142 generally along the radial direction R. Respective ones of the fan blades 140 are rotatable relative to the disk 142 about a pitch axis P by virtue of the fan blades 140 being operatively coupled to an example actuation member 144 configured to collectively vary the pitch of the fan blades 140, e.g., in unison. The fan blades 140, the disk 142, and the actuation member 144 are together rotatable about the longitudinal centerline 102 by LP shaft 136 across an example power gear box 146. The power gear box 146 includes a plurality of gears for stepping down the rotational speed of the LP shaft 136 to a more efficient rotational fan speed. Accordingly, the turbomachine 106 is operably coupled to the fan 138 through the power gear box 146.

The disk 142 is covered by an example rotatable front nacelle or hub 148 aerodynamically contoured to promote an airflow through the plurality of fan blades 140. Additionally, the fan section 104 includes an example annular fan casing or outer nacelle 150 that at least partially and circumferentially, surrounds the fan 138 and at least a portion of the turbomachine 106.

More specifically, the outer nacelle 150 includes an example inner wall 152 and an example downstream section 154 of the inner wall 152 that extends over an outer portion of the turbomachine 106 to define a bypass airflow passage 156 therebetween. Additionally, in some examples, the outer nacelle 150 is supported relative to the turbomachine 106 by an example plurality of circumferentially spaced outlet guide vanes 155.

During operation of the aircraft engine 100, a volume of air 158 enters the aircraft engine 100 through an example inlet 160 of the outer nacelle 150 and/or fan section 104. As the volume of air 158 passes across the fan blades 140, a first portion of the air 158 as indicated by arrows 162 is directed or routed into the bypass airflow passage 156, and a second portion of the air 158 as indicated by arrow 164 is directed or routed into the core air flowpath 137. The ratio between an amount of airflow through the bypass airflow passage 156 (i.e., the first portion of air indicated by arrows 162) to an amount of airflow through the core air flowpath 137 (i.e., the second portion of air indicated by arrows 164) is known as a bypass ratio.

The pressure of the second portion of air indicated by arrows 164 is then increased as the air is routed through the high pressure (HP) compressor 124 and into the combustion section 126, where it is mixed with fuel and burned to provide combustion gases 166. The combustion gases 166 are routed from the combustion section 126, through the HP turbine 128 where a portion of thermal and/or kinetic energy from the combustion gases 166 is extracted via sequential stages of example HP turbine stator vanes 168 that are coupled to the outer casing 108 and example HP turbine rotor blades 170 that are coupled to the HP shaft 134. The extracted energy causes the HP shaft 134 to rotate to support operation of the HP compressor 124. The combustion gases 166 are routed through the LP turbine 130 where a second portion of thermal and kinetic energy is extracted from the combustion gases 166 via sequential stages of example LP turbine stator vanes 172 that are coupled to the outer casing 108 and example LP turbine rotor blades 174 that are coupled to the LP shaft 136. The extracted energy causes the LP shaft 136 to rotate, which supports operation of the LP compressor 122 and/or rotation of the fan 138.

The combustion gases 166 are routed through the jet exhaust nozzle section 132 of the turbomachine 106 to provide propulsive thrust. Simultaneously, the pressure of the first portion of air indicated by arrows 162 is substantially increased as the first portion of air 158 is routed through the bypass airflow passage 156 before it is exhausted from an example fan nozzle exhaust section 176, also providing propulsive thrust. The HP turbine 128, the LP turbine 130, and the jet exhaust nozzle section 132 at least partially define a hot gas path 178 for routing the combustion gases 166 through the turbomachine 106.

In some examples, the aircraft engine 100 may be a relatively large power class turbofan engine. Accordingly, when operated at the rated speed, the aircraft engine 100 may be configured to generate a relatively large amount of thrust. More specifically, when operated at the rated speed, the aircraft engine 100 may be configured to generate at least about 20,000 pounds of thrust, such as at least about 25,000 pounds of thrust, such as at least about 30,000 pounds of thrust, and up to, e.g., about 150,000 pounds of thrust. Accordingly, in some examples, the aircraft engine 100 may be referred to as a relatively large power class gas turbine engine.

In addition, the aircraft engine 100 depicted in FIG. 1 is an example, and there may be other examples with different components. In some examples, the fan 138 may not be a variable pitch fan. In some examples, the aircraft engine 100 may not include a reduction gearbox (e.g., the power gear box 146) driving the fan 138. In some examples, the aircraft engine 100 may include any other suitable number or arrangement of shafts, spools, compressors, turbines, etc. In some examples, the aircraft engine 100 may be an open fan configuration that lacks the outer nacelle 150.

The aircraft engine 100 also includes an example anti-ice system 190 that can harvest thermal energy from the combustion gases 166 and/or redirect or convey thermal energy to other parts of the aircraft. The harvested thermal energy can be used to prevent or reduce ice buildup or ice formation on portions of the aircraft and/or be used to provide heat to a part of the aircraft (e.g., the passenger cabin and/or cockpit).

The anti-ice system 190 includes an example supply duct 192 to accept bleed air from the compressor section 121. In some examples, the anti-ice system 190 includes a duct to accept bleed air from another part of the aircraft engine 100 such as, for example, the bypass airflow passage 156. The anti-ice system 190 includes an example valve 194 that can be moved between an open and a closed position. When the valve 194 is in the closed position, bleed air is not accepted into the supply duct 192. With the valve 194 in the closed position, the anti-ice system 190 is off. When the valve 194 is in an open position, bleed air is accepted and can flow through the supply duct 192. The supply duct 192 routes the bleed air to an example heat exchange system 196. A heat exchange system includes, for example, heat sink(s), pipe(s), plate(s), baffle(s), fin(s), fluid(s), valve(s), waste heat recovery unit(s), controls, and/or other components to transfer or exchange heat from a source to the sink. In the illustrated example, the heat exchange system 196 is located in the turbine section 127 and/or near the jet exhaust nozzle section 132. The heat exchange system 196 captures waste heat from the turbine section 127 and/or jet exhaust nozzle section 132 and conveys the waste heat to the bleed air. The waste heat has a higher temperature than the bleed air in the compressor section 121. Thus, when the bleed air flows through the heat exchange system 196, the temperature of the bleed air is increased due to the waste heat.

In some examples, the heat exchange system 196, or at least a portion thereof, is wrapped circumferentially around the turbine section 127, the jet exhaust nozzle section 132, and/or other component of the aircraft engine 100. In some examples, the heat exchange system 196 includes a spiral wrap. FIG. 1 shows an example where a portion of the heat exchange system 196 is positioned at a top side of the turbine section 127 and a portion of the heat exchange system 196a is positioned at a bottom side of the turbine section 127. In this example, the heat exchange system 196, 196a is shown in cross-section wrapped about the turbine section 127. In some examples, the heat exchange system 196, 196a is a tube, a coil, a spring-shaped spiral coil, etc.

The heat exchange system 196 can increase the temperature of the bleed air to greater than the autoignition temperature of the jet fuel. In some examples, the heat exchange system 196 increases the temperature of the bleed air to over about 210 degrees Celsius (approximately 410 degrees Fahrenheit) and/or over about 232 degrees Celsius (approximately 450 degrees Fahrenheit). The supply duct 192 continues after the heat exchange system 196 to supply heated bleed air to other portions of the aircraft such as, for example, the wings. The heated bleed air can be used to prevent ice formation and or melt accumulated ice. In some examples, the heat exchange system 196 increases the temperature of the bleed air with an upper temperature limit of about 550 degrees Celsius (approximately 1000 degrees Fahrenheit).

The components of the anti-ice system 190 are shown schematically over the details of the aircraft engine 100 in FIG. 1. The anti-ice system 190 is symbolically represented in FIG. 1 and not shown scaled or assembled within the aircraft engine 100. Similar schematic representations also are presented in the examples of FIGS. 2-5.

Figure 2:
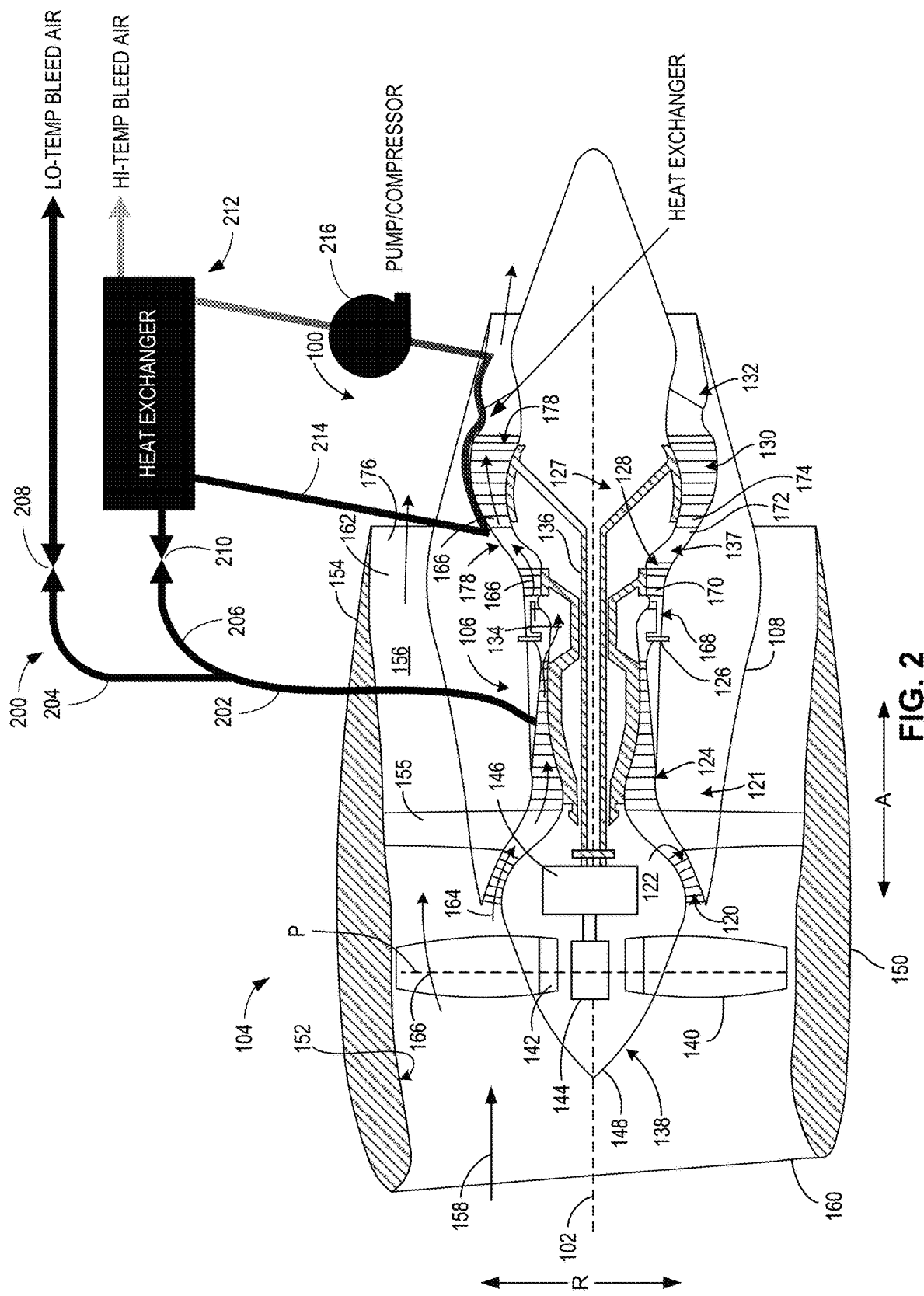
FIG. 2 is a schematic cross-sectional view of the aircraft engine with another anti-ice system according to the teachings of this disclosure.

FIG. 2 is a schematic cross-sectional view of the aircraft engine 100 with another example anti-ice system 200. The anti-ice system 200 uses a thermal transport bus to harvest thermal energy from the combustion gases 166 and/or redirect or convey thermal energy to other parts of the aircraft. Details related to the use of the harvested thermal energy, waste heat, and temperatures disclosed in the example of FIG. 1 also apply to the anti-ice system 200.

The anti-ice system 200 includes an example main supply duct 202 to accept bleed air from the compressor section 121. In some examples, the anti-ice system 200 includes a duct to accept bleed air from another part of the aircraft engine 100 such as, for example, the bypass airflow passage 156. The main supply duct 202 branches into a first supply duct 204 and a second supply duct 206. In some examples, the first supply duct 204 and the second supply duct 206 are separate from the respective intakes at the compressor section 121. In other words, in some examples, the first supply duct 204 and the second supply duct 206 are not coupled to the main supply duct 202 but, rather, have individual intake openings to accept bleed air.

The anti-ice system 200 includes a first example valve 208 that can be moved between an open and a closed position. When the first valve 208 is in the closed position, bleed air is not accepted into the first supply duct 204. When the first valve 208 is in an open position, bleed air is accepted and can flow through the first supply duct 204. The first supply duct 204 supplies bleed air to other portions of the aircraft such as, for example, the wings. The bleed air can be used to prevent ice formation and or melt accumulated ice.

The anti-ice system 200 includes a second example valve 210 that can be moved between an open and a closed position. When the second valve 210 is in the closed position, bleed air is not accepted into the second supply duct 206. When the second valve 210 is in an open position, bleed air is accepted and can flow through the second supply duct 206. The second supply duct 206 routes the bleed air to an example heat exchange system 212. In the illustrated example, the heat exchange system 212 is located in the turbine section 127 and/or near the jet exhaust nozzle section 132.

The heat exchange system 212 includes an example closed flowpath 214 with a fluid in the closed flowpath 214 that forms the thermal transport bus. The heat exchange system 212 includes an example compressor or pump 216 that circulates the fluid within the closed flowpath 214. The pump 216 may be located in the aircraft engine 100 or on the aircraft. In some examples, at least a portion of the closed flowpath 214 is adjacent or in the turbine section 127. In some examples, at least a portion of the closed flowpath 214 is in a post-combustion exhaust path in the turbine section 127.

Fluid in the closed flowpath 214 captures waste heat from the turbine section 127 and/or jet exhaust nozzle section 132 and conveys the waste heat to the bleed air. The waste heat has a higher temperature than the bleed air in the compressor section 121. Thus, when the bleed air flows through the heat exchange system 196, the temperature of the bleed air is increased due to the waste heat captured by the fluid in the closed flowpath 214.

In some examples, the fluid includes a gas. In some examples, the fluid includes a supercritical gas. Supercritical fluids include fluids at temperatures and pressures above their critical point, where there are not distinct liquids or gas phases. In some examples, the fluid includes supercritical carbon dioxide ($sCO_2$). In some examples, the fluid includes supercritical nitrogen ($sN_2$). In some examples, the fluid includes Helium (He). In some examples, the fluid includes a liquid such as ethylene glycol and water (EGW) and/or one or more commercial thermal transport fluids. In some examples, the fluid includes a phase-changing material such as a commercial refrigerant.

The pump 216 controls the flow of fluid through the closed flowpath 214. The pump 216 can modify or alter the rate of flow of the fluid. The rate of flow of the fluid through the closed flowpath 214 controls the amount of waste heat harvested by the fluid and, thus, the amount of waste heat conveyed by the heat exchange system 212 to the bleed air.

The heat exchange system 212 can increase the temperature of the bleed air to greater than the autoignition temperature of the jet fuel. The second supply duct 206 continues after the heat exchange system 212 to supply heated bleed air to other portions of the aircraft such as the wings, to prevent ice formation and or melt accumulated ice.

The bleed air in the first supply duct 204 is at a temperature lower than the bleed air in the second supply duct 206 that has been heated in the heat exchange system 212. In some examples, the bleed air in the first supply duct 204 is below the autoignition temperature of jet fuel, and the bleed air in the second supply duct 206 that has been heated in the heat exchange system 212 is at or above the autoignition temperature of jet fuel. Bleed air in the first supply duct 204 can be provided to a first portion of the aircraft, and bleed air in the second supply duct 206 that has been treated in the heat exchange system 212 can be supplied to a second portion of the aircraft. In some examples, the first portion of the aircraft is closer to the fuel tanks or fuel passage than the second portion of the aircraft. In other words, the first portion of the aircraft is a first distance from one or more of the fuel tanks or fuel passage and the second portion of the aircraft is a second distance from one or more of the fuel tanks or fuel passage, the second distance greater than the first distance. The portions of the aircraft further or distal from the fuel tanks or fuel passage can include, for example, portions of the wings, the tail, sensors, and/or interior portions including the cockpit, the passenger cabin, and/or other environmental control systems.

Figure 3:
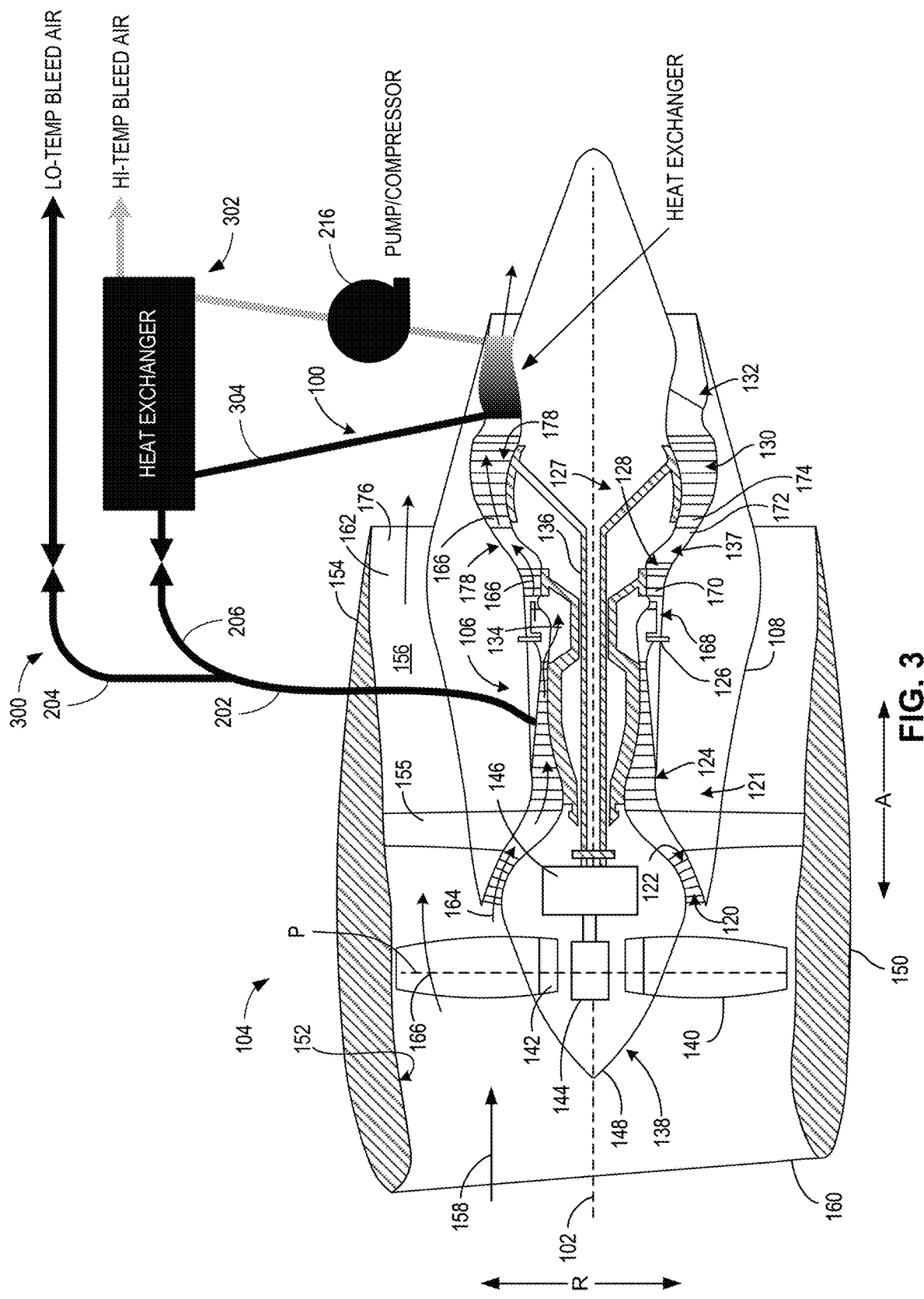
FIG. 3 is a schematic cross-sectional view of the aircraft engine with another anti-ice system according to the teachings of this disclosure.

FIG. 3 is a schematic cross-sectional view of the aircraft engine 100 with another example anti-ice system 300. The anti-ice system 300 of FIG. 3 is similar to the anti-ice system 200 of FIG. 2. However, in the anti-ice system 300 of FIG. 3, there is an example heat exchange system 302 that includes an example closed flowpath 304 that is positioned in the hot gas path 178 at the jet exhaust nozzle section 132. Other aspects disclosed herein apply to the example of FIG. 3.

Figure 4:
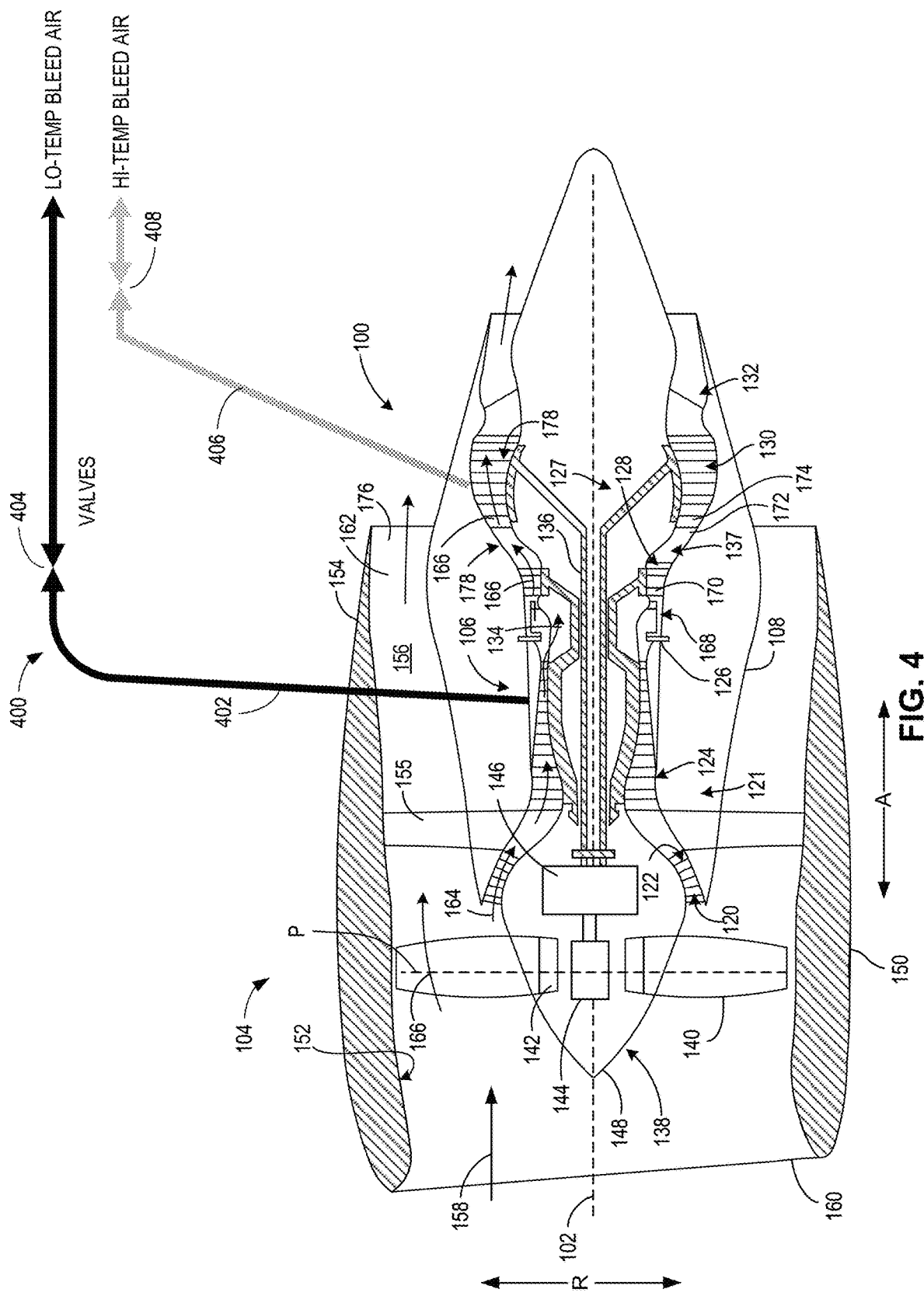
FIG. 4 is a schematic cross-sectional view of the aircraft engine with another anti-ice system according to the teachings of this disclosure.

FIG. 4 is a schematic cross-sectional view of the aircraft engine 100 with another example anti-ice system 400. Details related to the use of the harvested thermal energy, waste heat, and temperatures disclosed in the other example anti-ice systems apply to the anti-ice system 400 of FIG. 4.

The anti-ice system 400 includes an example first supply duct 402 to accept bleed air from the compressor section 121. In some examples, the anti-ice system 400 includes a duct to accept bleed air from another part of the aircraft engine 100 such as the bypass airflow passage 156. The anti-ice system 400 includes a first example valve 404 that can be moved between an open and a closed position. When the first valve 404 is in the closed position, bleed air is not accepted into the first supply duct 402. When the first valve 404 is in an open position, bleed air is accepted and can flow through the first supply duct 402.

The anti-ice system 400 includes a second example supply duct 406 to accept bleed air from the turbine section 127. The anti-ice system 400 also includes a second valve 408 that can be moved between an open and a closed position. When the second valve 408 is in the closed position, bleed air is not accepted into the second supply duct 406. When the second valve 408 is in an open position, bleed air is accepted and can flow through the second supply duct 406. In the example of FIG. 4, the bleed air in the first supply duct 402 is pre-combustion bleed air, and the bleed air in the second supply duct 406 is post-combustion bleed air. The post-combustion bleed air is at a much higher temperature than the pre-combustion bleed air. In other words, the post-combustion bleed air is at a first temperature, and the pre-combustion bleed air is at a second temperature, the first temperature greater than the second temperature. In some examples, the first temperature is at or above the autoignition temperature of jet fuel. In some examples, the second temperature is below the autoignition temperature of jet fuel.

Due to the disparate temperatures of the bleed air in the first supply duct 402 and the second supply duct 406, the bleed air in the respective ducts 402, 406 can be used in different portions of the aircraft. For example, the lower temperature bleed air in the first supply duct 402 can be used near one or more fuel tanks or fuel passage. The lower temperature bleed air in the first supply duct 402 also can be used elsewhere around and inside the aircraft. The higher temperature bleed air in the second supply duct 406 can be used in areas of the aircraft distal to the fuel tanks or fuel passage. In other words, bleed air in the second supply duct 406 can be used in areas of the aircraft located a first distance from a fuel tank or fuel passage, and bleed air in the first supply duct 402 can be used in areas of the aircraft located the first distance from the fuel tank or fuel passage or a second distance from the fuel tank or fuel passage, the second distance less than the first distance.

The direct harvesting of high temperature bleed air in the hot gas path 178 eliminates the need to heat bleed air. In addition, this direct harvesting of high temperature bleed air by the second supply duct 406 reduces the number of components used to gather waste heat and decreases and/or minimizes system weight.

Figure 5:
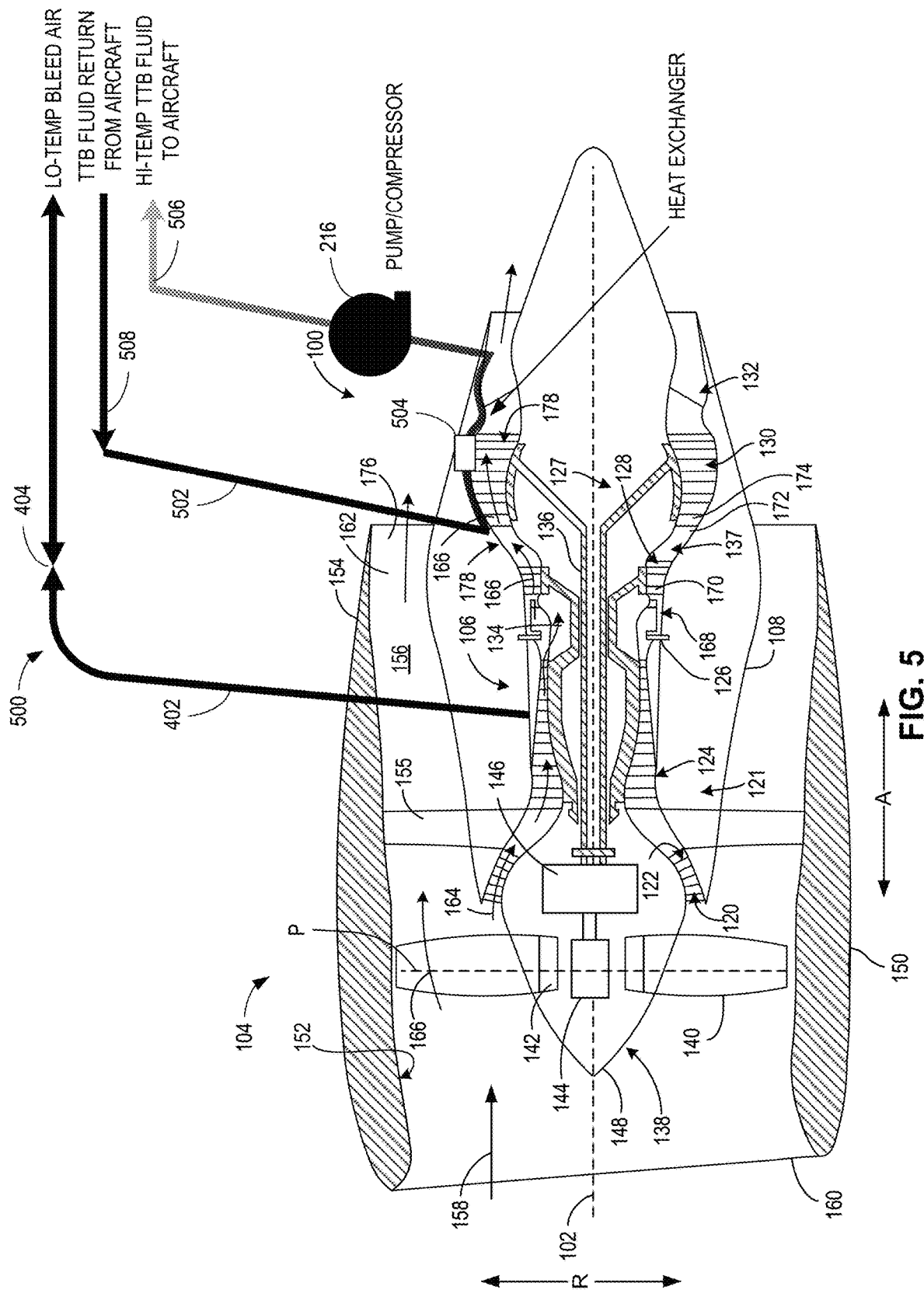
FIG. 5 is a schematic cross-sectional view of the aircraft engine with another anti-ice system according to the teachings of this disclosure.

FIG. 5 is a schematic cross-sectional view the aircraft engine 100 with another example anti-ice system 500. As with the other examples, details related to the use of the harvested thermal energy, waste heat, and temperatures disclosed in the other example anti-ice systems apply to the anti-ice system 500 of FIG. 5. In addition, the anti-ice system 500 includes the first supply duct 402 and valve 404 that operate the same as in the anti-ice system 400 of FIG. 4.

The anti-ice system 500 also includes an example closed flowpath 502 in which a thermal transport fluid circulates. The fluid may include one or more of the fluids disclosed in the examples of FIGS. 2 and 3. The anti-ice system 500 also includes the pump 216 to circulate fluid in the closed flowpath 502. The anti-ice system 500 includes an example heat exchange system 504, which may be similar to other heat exchanger systems disclosed herein. The heat exchange system 504 may be located in or near the turbine section 127 and/or the jet exhaust nozzle section 132, and/or in the hot gas path 178 as disclosed above in other examples.

The anti-ice system 500 does not heat bleed air with the fluid in the closed flowpath 502. The heat exchange system 504 conveys waste heat from the aircraft engine 100 to the fluid in the flowpath 502. The heated fluid in the flowpath 502 may be at a temperature above the autoignition temperature of jet fuel. The heated fluid in the flowpath 502 is conveyed in an outbound duct 506 of the flowpath 502 to the aircraft for anti-icing functions disclosed here. In examples with the fluid in the flowpath 502 at or above the autoignition temperature of jet fuel, the fluid is conveyed to areas of the aircraft away from the fuel tanks and fuel passage. The fluid circulates back in the flowpath 502 in an inbound or return duct 508 at a lower temperature than the heated fluid in the outbound duct 506. In other words, the heat exchange system 504 and pump 216 provide the fluid from the aircraft engine 100 to an aircraft at a first temperature and receive the fluid in the return duct 508 at a second temperature, the first temperature greater than the second temperature.

Figure 6:
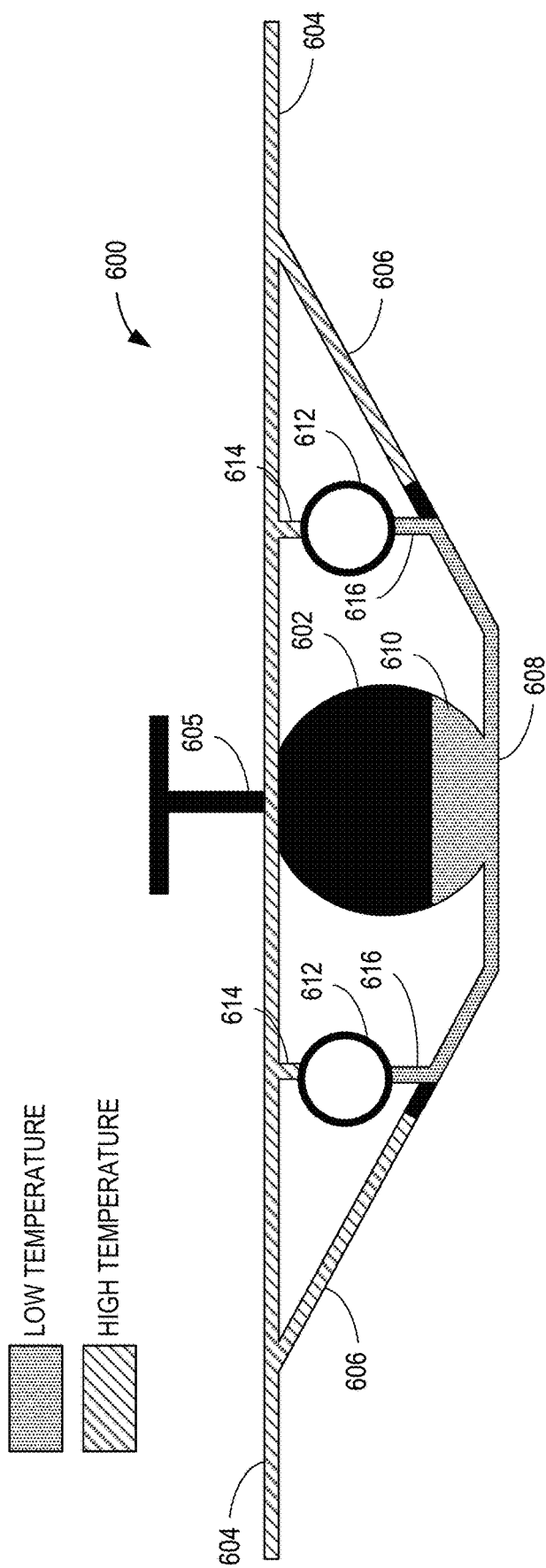
FIG. 6 is a schematic illustration of an example truss braced wing aircraft with the engines mounted in a first configuration.

FIG. 6 is a schematic illustration of an example truss braced wing aircraft 600. The aircraft includes fuselage 602, wings 604, and a tail 605. The wings 604 are braced by trusses 606, which are coupled to a base support 608. The aircraft 600 includes a fuel tank 610 in the fuselage 602. The aircraft also includes engines 612. The engines 612 are mounted to the wings 604 via first pylons 614. The engines 612 also are supported by the trusses 606 via second pylons 616. In this example, fuel is supplied from the fuel tank 610 to the engines 612 via the passages in the second pylons 616.

One or more of the anti-ice systems 190, 200, 300, 400, 500 disclosed herein may be incorporated into the aircraft 600 to provide anti-ice functions to the aircraft 600 including, for example, to the fuselage 602, the wings 604, the trusses 606, the base support 608, the first pylons 614, and the second pylons 616. As disclosed above, bleed air, heated bleed air, thermal transport fluid, and/or heated thermal transport fluid, may be used to provide the anti-ice functions.

The anti-ice systems 190, 200, 300, 400, 500 send or convey low temperature bleed air and/or thermal transport fluid to areas at or near the fuel tank 610 and fuel passage. In the example of FIG. 6, the areas at or near the fuel tank 610 and fuel passage include the fuel tank 610 and surrounding fuselage 602, the base support 608 through which fuel passes, the lower portions of the trusses 606 between the second pylons 616 and the base support 608 through which fuel passes, and the second pylons 616 through which fuel passes.

The anti-ice systems 190, 200, 300, 400, 500 send or convey high temperature bleed air and/or thermal transport fluid to areas away or distal from the fuel tank 610 and fuel passage. In the example of FIG. 6, the areas away or distal from the fuel tank 610 and fuel passage include the wings 604, the upper portions of the trusses 606 between the wings 604 and the second pylons 616, and the first pylons 614. In some examples, the anti-ice systems 190, 200, 300, 400, 500 send or convey low temperature bleed air and/or thermal transport fluid to areas away or distal from the fuel tank 610 and fuel passage. The difference between "low" and "high" temperatures is relative. For the purposes of this disclosure, "low temperatures" are temperatures below the autoignition temperature of jet fuel, and "high temperatures" are temperatures at or above the autoignition temperature of jet fuel.

Figure 7:
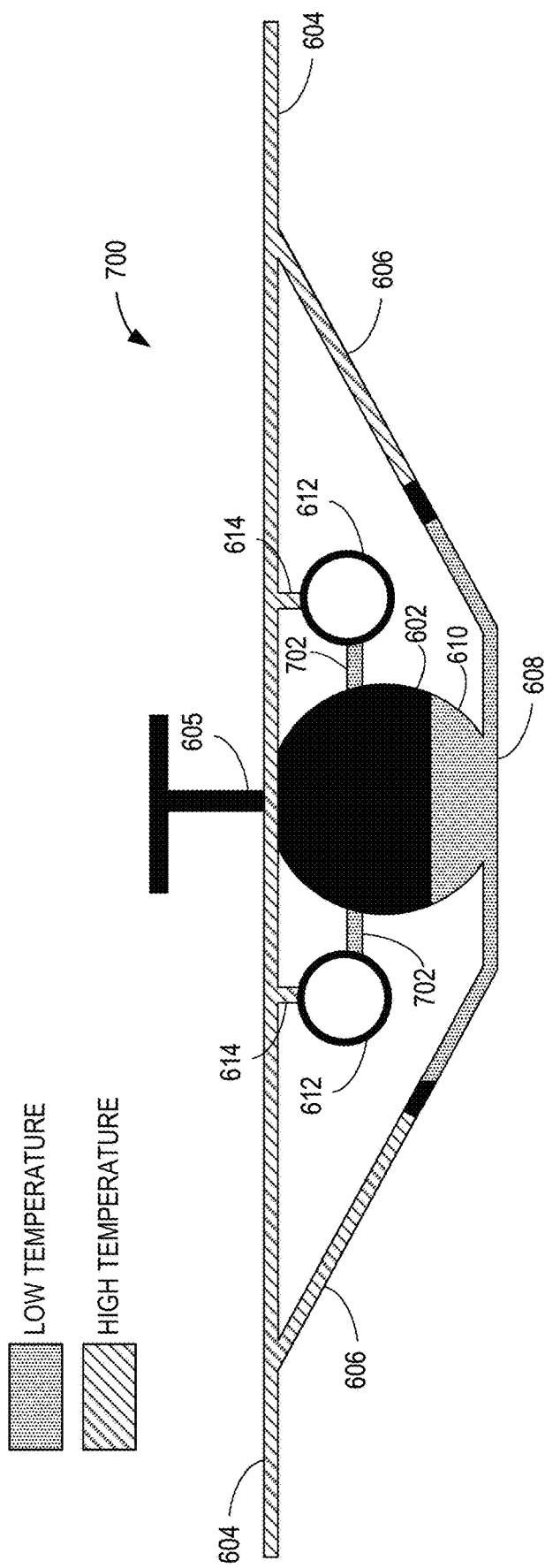
FIG. 7 is a schematic illustration of an example truss braced wing aircraft with the engines mounted in a second configuration.

FIG. 7 is a schematic illustration of an example truss braced wing aircraft 700. The aircraft 700 includes the fuselage 602, the wings 604, the tail 605, the trusses 606, the base support 608, the fuel tank 610, the engines 612 mounted in a second configuration, and the first pylons 614. In the example of FIG. 7, the engines 612 are supported by third pylons 702 directly to the fuselage 602. One or more of the anti-ice systems 190, 200, 300, 400, 500 disclosed herein may be incorporated into the aircraft 700 to provide anti-ice functions to the aircraft 700.

The anti-ice systems 190, 200, 300, 400, 500 send or convey low temperature bleed air and/or thermal transport fluid to areas at or near the fuel tank 610 and fuel passage. In the example of FIG. 7, the areas at or near the fuel tank 610 and fuel passage include the fuel tank 610 and surrounding fuselage 602, the base support 608, the lower portions of the trusses 606 near the fuel tank 610, and the third pylons 702 through which fuel passes.

The anti-ice systems 190, 200, 300, 400, 500 send or convey high temperature bleed air and/or thermal transport fluid to areas away or distal from the fuel tank 610 and fuel passage. In the example of FIG. 7, the areas away or distal from the fuel tank 610 and fuel passage include the wings 604, the upper portions of the trusses 606 closer to the wings and away from the fuel tank 610, and the first pylons 614. As with the example of FIG. 6, in some examples with the aircraft of FIG. 7, the anti-ice systems 190, 200, 300, 400, 500 send or convey low temperature bleed air and/or thermal transport fluid to areas away or distal from the fuel tank 610 and fuel passage.

Figure 8:
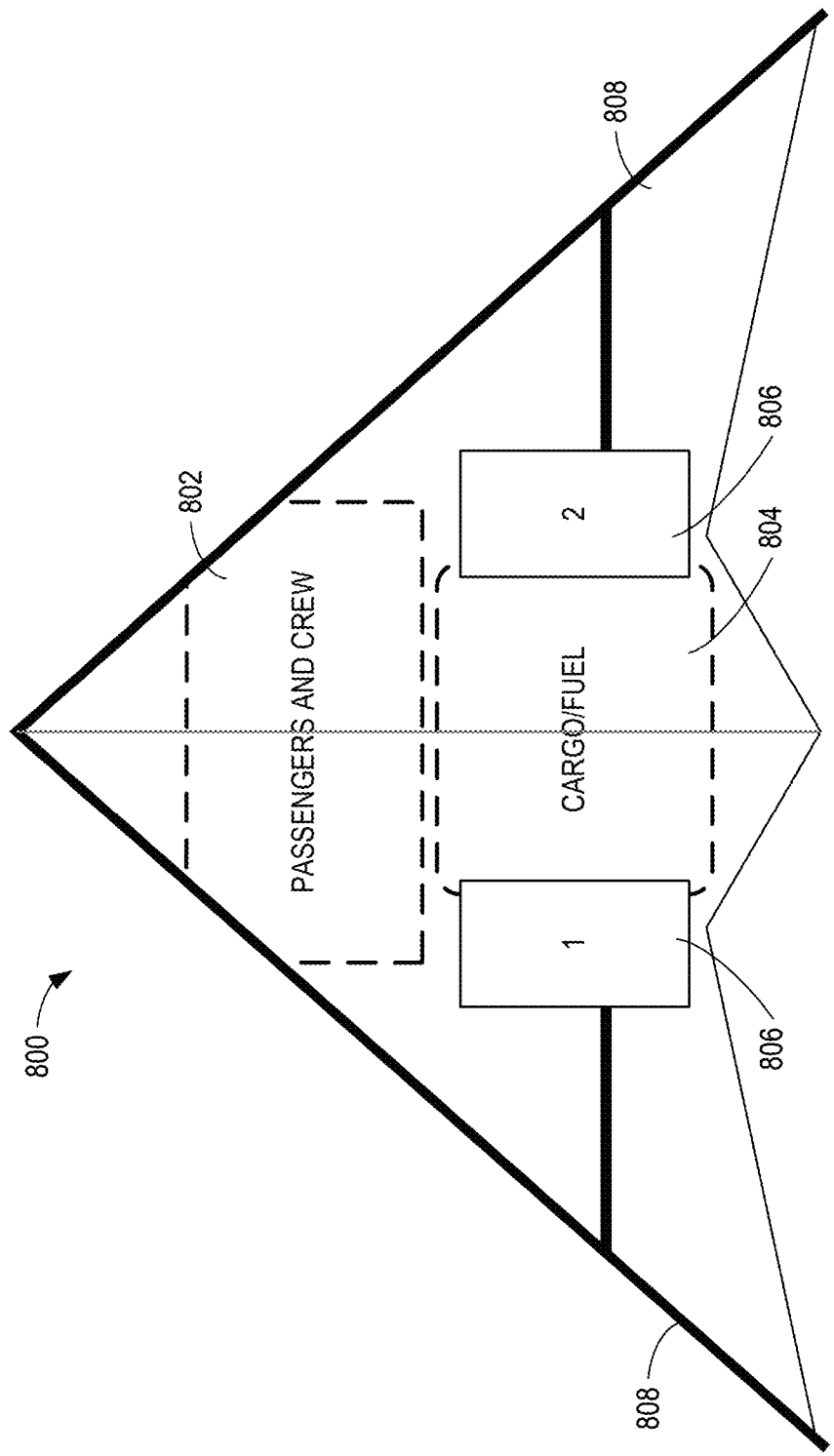
FIG. 8 is a schematic illustration of an example blended wing body aircraft.

FIG. 8 is a schematic illustration of an example blended wing body aircraft 800. The blend wing body aircraft 800 includes an interior cabin 802, a fuel tank 804, engines 806, and wings 808. One or more of the anti-ice systems 190, 200, 300, 400, 500 disclosed herein may be incorporated into the aircraft 800 to provide anti-ice functions to the aircraft 800, as disclosed herein.

The anti-ice systems 190, 200, 300, 400, 500 send or convey high temperature bleed air and/or thermal transport fluid to areas away or distal from the fuel tank 804 and fuel passage. In the example of FIG. 8, the areas away or distal from the fuel tank 804 and fuel passage include the leading edges of the wings 808 and any internal areas away from the fuel tank 804.

Figure 9:
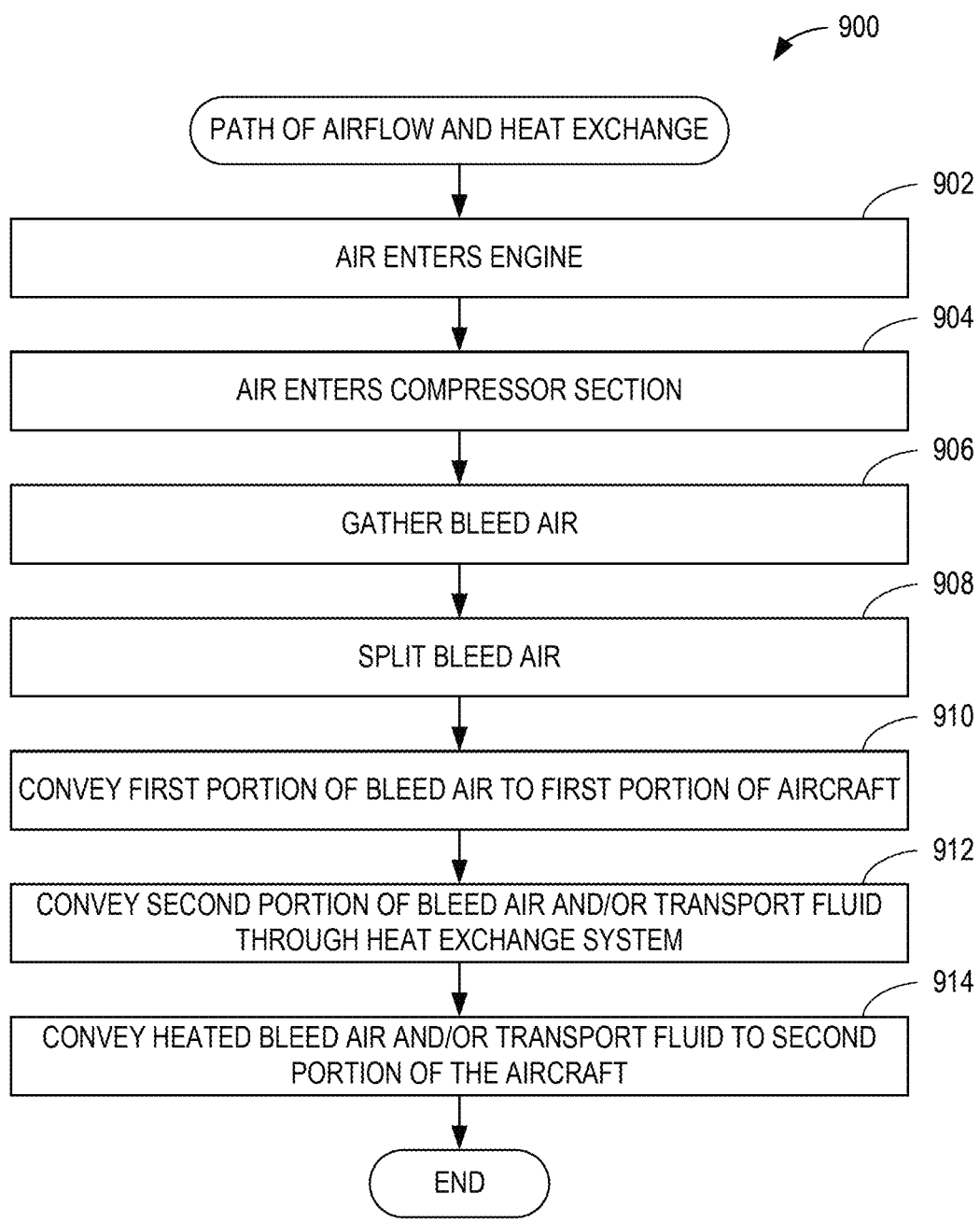
FIG. 9 is a flow chart representing an example path of airflow and heat exchange through an engine.

FIG. 9 is a flow chart representing an example path 900 of airflow and heat exchange through an engine (e.g. the engines 100, 612, 806). The example path 900 includes the air entering the engine (block 902). For example, the volume of air 158 enters the aircraft engine 100. The air enters the compressor section of engine (block 904). For example, the second portion of air 164 is routed in the core airflow path 137 into the compressor section 121. Bleed air is gathered (block 906). For example, the bleed air may be accepted into one of the supply ducts 192, 202, 402.

In some examples, the bleed air is split (block 908), and a portion of the bleed air conveyed to a first portion of the aircraft (block 910). For example, a first portion of the bleed air may be split into the first supply duct 204 and used a low temperature bleed air to convey heat to portions of the aircraft near the fuel tanks and/or fuel passage. In this example, a second portion of the bleed air is split into the second supply duct 206 for conveyance through the heat exchange system 302. In other examples, bleed air is not split but low temperature bleed air and high temperature bleed air operate and/or circulate in separate flow paths such as in the anti-ice system 400 of FIG. 4 and/or the anti-ice system 500 and the heat exchange system 504 of FIG. 5.

The second portion of the bleed air (or the bleed air if the bleed air is not split) and/or transport fluid is conveyed through the heat exchange system (block 912). For example, the bleed air and/or transport fluid is conveyed through the heat exchange system 212, 302, 502 where heat is gathered from the turbine section 127 and/or the jet exhaust nozzle section 132 to heat the bleed air and/or transport fluid. The heated bleed air and/or transport fluid is conveyed to a second portion of the aircraft (block 914). The heated bleed air and/or transport fluid is high temperature (e.g., above the autoignition temperature of jet fuel) that can be used de-ice or prevent ice at portions of the aircraft distal to the fuel tanks and/or fuel passage. In some examples, the transport fluid is circulated back to the heat exchange system, as disclosed above.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Additionally, the terms "low," "high," or their respective comparative degrees (e.g., lower, higher, where applicable) each refer to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

From the foregoing, it will be appreciated that aircraft engines disclosed herein include anti-ice systems that harvest waste heat and convey the heat to bleed air and/or thermal transport fluid to increase the temperature of the bleed air and/or thermal transport fluid at or above the autoignition temperature of jet fuel. The high temperature bleed air and/or thermal transport fluid can be used in areas of the aircraft distal to the fuel tanks and fuel passage to provide greater anti-ice functionality than traditional systems that operate at lower temperatures. Because the high temperature bleed air and/or thermal transport fluid is used in areas of the aircraft distal to the fuel tanks and fuel lines for fuel passage, autoignition of the fuel is avoided. In other words, though the bleed air and/or thermal transport fluid are at temperatures above the autoignition temperature of jet fuel, the bleed air and/or thermal transport fluid are sufficiently separate from the jet fuel to avoid conveying heat to the jet fuel that would heat the jet fuel to temperatures above autoignition temperatures. The anti-ice systems can, therefore, convey more heat to areas of the aircraft using less bleed air and/or thermal transport fluid. Therefore, these disclosed anti-ice systems make the aircraft engine more efficient.

Further examples and example combinations thereof are provided by the subject matter of the following clauses:

An aircraft engine including: a fan including a plurality of fan blades; a turbomachine operably coupled to the fan for driving the fan, the turbomachine including a compressor section, a combustion section, and a turbine section; a supply duct to accept bleed air from the compressor section; and a heat exchange system to capture waste heat from the turbine section and convey the waste heat to the bleed air, the bleed air with the waste heat to be conveyed to at least one of an environmental control system or a wing of an aircraft.

The aircraft engine of any preceding clause, wherein the heat exchange system is to increase the bleed air to over 210 degrees Celsius.

The aircraft engine of any preceding clause, wherein the heat exchange system is to increase the bleed air to over 232 degrees Celsius.

The aircraft engine of any preceding clause, wherein the heat exchange system is to increase the bleed air to over an autoignition temperature of jet fuel.

The aircraft engine of any preceding clause, wherein the heat exchange system includes: a closed flowpath; a fluid in the closed flowpath; and a pump to circulate the fluid in the closed flowpath.

The aircraft engine of any preceding clause, wherein a portion of the closed flowpath is adjacent the turbine section.

The aircraft engine of any preceding clause, wherein a portion of the closed flowpath is in a post-combustion exhaust path in the turbine section.

The aircraft engine of any preceding clause, wherein the fluid includes a supercritical gas.

The aircraft engine of any preceding clause, wherein the pump is to control a rate of flow of the fluid in the closed flowpath to control an amount of waste heat conveyed by the heat exchange system to the bleed air.

The aircraft engine of any preceding clause, wherein the supply duct is a first supply duct, and the aircraft engine further including a second supply duct to accept the bleed air from the compressor section, wherein the first supply duct is to provide the bleed air with waste heat to a first portion of an aircraft and the second supply duct is to provide the bleed air to a second portion of the aircraft.

The aircraft engine of any preceding clause, wherein the bleed air with waste heat in the first supply duct has a greater temperature than the bleed air in the second supply duct.

The aircraft engine of any preceding clause, wherein the first portion of the aircraft is a first distance from a fuel tank and the second portion of the aircraft is a second distance from the fuel tank, the second distance less than the first distance.

The aircraft engine of any preceding clause, wherein the first portion includes at least one of a wing of the aircraft or a first portion of a truss near the wing and the second portion includes a second portion of the truss near fuselage.

The aircraft engine of any preceding clause, including: a fan including a plurality of fan blades; a turbomachine operably coupled to the fan for driving the fan, the turbomachine including a compressor section, a combustion section, and a turbine section; and a supply duct to accept post-combustion bleed air from the turbine section.

The aircraft engine of any preceding clause, wherein the supply duct is a first supply duct, and the aircraft engine further including a second supply duct to accept pre-combustion bleed air from the compressor section, wherein the first supply duct is to provide the post-combustion bleed air to a first portion of an aircraft and the second supply duct is to provide the pre-combustion bleed air to a second portion of the aircraft.

The aircraft engine of any preceding clause, wherein the first portion of the aircraft is a first distance from a fuel tank and the second portion of the aircraft is a second distance from the fuel tank, the second distance less than the first distance.

The aircraft engine of any preceding clause, including: a fan including a plurality of fan blades; a turbomachine operably coupled to the fan for driving the fan, the turbomachine including a compressor section, a combustion section, and a turbine section; and a heat exchange system including: a closed flowpath; a fluid in the closed flowpath; and a pump to circulate the fluid in the closed flowpath, wherein a portion of the closed flowpath is at least one of (1) adjacent the turbine section or (2) in a post-combustion exhaust path in the turbine section, the heat exchange system to convey waste heat to the fluid.

The aircraft engine of any preceding clause, wherein the fluid includes a phase-changing material.

The aircraft engine of any preceding clause, including a return duct, the heat exchange system is to provide the fluid from the aircraft engine to an aircraft at a first temperature and to receive the fluid from the return duct at a second temperature, the first temperature greater than the second temperature.

The aircraft engine of any preceding clause, including a supply duct to accept bleed air from the compressor section, wherein the heat exchange system is to provide the fluid with waste heat to a first portion of an aircraft and the supply duct is to provide the bleed air to a second portion of the aircraft.

The aircraft engine of any preceding clause, wherein the fluid with waste heat has a greater temperature than the bleed air.

The aircraft engine of any preceding clause, wherein the first portion of the aircraft is a first distance from a fuel tank and the second portion of the aircraft is a second distance from the fuel tank, the second distance less than the first distance.

The aircraft engine of any preceding clause, wherein the first portion of the aircraft includes a wing and the second portion of the aircraft includes an interior cabin.

The aircraft engine of any preceding clause, wherein the heat exchange system is positioned near the exhaust nozzle.

The aircraft engine of any preceding clause including: a fan including a plurality of fan blades; a turbomachine operably coupled to the fan for driving the fan, the turbomachine including an exhaust nozzle; a supply duct to accept bleed air from the compressor section; and a heat exchange system to capture waste heat adjacent the exhaust nozzle and convey the waste heat to the bleed air.

The aircraft engine of any preceding clause, wherein the heat exchange system includes a thermal transport bus.

The aircraft engine of any preceding clause, wherein a portion of the heat exchange system is wrapped about at least a portion of the turbine section.

The aircraft engine of any preceding clause wherein the thermal transport bus includes a closed flowpath; a fluid in the closed flowpath; and a pump to circulate the fluid in the closed flowpath.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An aircraft engine comprising:
   a fan including a plurality of fan blades;
   a turbomachine operably coupled to the fan for driving the fan, the turbomachine including a compressor section, a combustion section, and a turbine section;
   a supply duct to accept bleed air from the compressor section; and
   a heat exchange system to capture waste heat from the turbine section and convey the waste heat to the bleed air, the bleed air with the waste heat to be conveyed to at least one of an environmental control system or a wing of an aircraft, wherein a portion of the heat exchange system is wrapped about at least a portion of the turbine section.

2. The aircraft engine of claim 1, wherein the heat exchange system is to increase the bleed air to at least one of: (a) over 210 degrees Celsius or (b) over an autoignition temperature of jet fuel.

3. The aircraft engine of claim 1, wherein the heat exchange system is to increase the bleed air to over 232 degrees Celsius.

4. The aircraft engine of claim 1, wherein the heat exchange system includes a thermal transport bus including:
   a closed flowpath;
   a fluid in the closed flowpath; and
   a pump to circulate the fluid in the closed flowpath.

5. The aircraft engine of claim 4, wherein the pump is to control a rate of flow of the fluid in the closed flowpath to control an amount of waste heat conveyed by the heat exchange system to the bleed air.

6. The aircraft engine of claim 1, wherein a portion of at least one of the heat exchange system is or the supply duct is adjacent the turbine section.

7. The aircraft engine of claim 1, wherein a portion of at least one of the heat exchange system is or the supply duct is in a post-combustion exhaust path in the turbine section.

8. The aircraft engine of claim 1, wherein the supply duct is a first supply duct, and the aircraft engine further including a second supply duct to accept the bleed air from the compressor section, wherein the first supply duct is to provide the bleed air with waste heat to a first portion of the aircraft and the second supply duct is to provide the bleed air to a second portion of the aircraft.

9. The aircraft engine of claim 8, wherein the bleed air with waste heat in the first supply duct has a greater temperature than the bleed air in the second supply duct.

10. The aircraft engine of claim 8, wherein the first portion of the aircraft is a first distance from a fuel tank and the second portion of the aircraft is a second distance from the fuel tank, the second distance less than the first distance.

11. The aircraft engine of claim 10, wherein the first portion includes at least one of a wing of the aircraft or a first portion of a truss near the wing and the second portion includes a second portion of the truss near fuselage.

12. The aircraft engine of claim 1, wherein the heat exchange system is spirally wrapped circumferentially around the turbine section.

13. An aircraft engine comprising:
a fan including a plurality of fan blades;
a turbomachine operably coupled to the fan for driving the fan, the turbomachine including a compressor section, a combustion section, and a turbine section;
a supply duct to accept post-combustion bleed air from the turbine section; and
a heat exchange system that is wrapped about at least a portion of the turbine section, the heat exchange system to capture waste heat from the turbine section.

14. The aircraft engine of claim 13, wherein the supply duct is a first supply duct, and the aircraft engine further including a second supply duct to accept pre-combustion bleed air from the compressor section, wherein the first supply duct is to provide the post-combustion bleed air to a first portion of an aircraft and the second supply duct is to provide the pre-combustion bleed air to a second portion of the aircraft.

15. An aircraft engine comprising:
a fan including a plurality of fan blades;
a turbomachine operably coupled to the fan for driving the fan, the turbomachine including a compressor section, a combustion section, and a turbine section; and
a heat exchange system including:
a closed flowpath;
a fluid in the closed flowpath; and
a pump to circulate the fluid in the closed flowpath, wherein a portion of the closed flowpath is at least one of (1) adjacent the turbine section or (2) in a post-combustion exhaust path in the turbine section, the heat exchange system to convey waste heat to the fluid, wherein a portion of the heat exchange system is wrapped about at least a portion of the turbine section.

16. The aircraft engine of claim 15, further including a return duct, the heat exchange system is to provide the fluid from the aircraft engine to an aircraft at a first temperature and to receive the fluid from the return duct at a second temperature, the first temperature greater than the second temperature.

17. The aircraft engine of claim 15, further including a supply duct to accept bleed air from the compressor section, wherein the heat exchange system is to provide the fluid with waste heat to a first portion of an aircraft and the supply duct is to provide the bleed air to a second portion of the aircraft.

18. The aircraft engine of claim 17, wherein the fluid with waste heat has a greater temperature than the bleed air.

19. The aircraft engine of claim 17, wherein the first portion of the aircraft is a first distance from a fuel tank and the second portion of the aircraft is a second distance from the fuel tank, the second distance less than the first distance.

20. The aircraft engine of claim 17, wherein the first portion of the aircraft includes a wing and the second portion of the aircraft includes an interior cabin.

* * * * *